United States Patent
Ahn et al.

(10) Patent No.: US 8,533,443 B2
(45) Date of Patent: Sep. 10, 2013

(54) COMPUTER SYSTEM AND CONTROL METHOD THEREOF

(75) Inventors: Jang-hwan Ahn, Suwon-si (KR); Kum-ho Shin, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 12/357,715

(22) Filed: Jan. 22, 2009

(65) Prior Publication Data

US 2010/0011201 A1    Jan. 14, 2010

(30) Foreign Application Priority Data

Jul. 10, 2008   (KR) ................. 10-2008-0067074

(51) Int. Cl.
*G06F 9/00*    (2006.01)
*G06F 15/177*  (2006.01)

(52) U.S. Cl.
USPC ..................... 713/1; 713/2; 726/2

(58) Field of Classification Search
USPC ............................. 713/1, 2; 726/2
See application file for complete search history.

(56) References Cited

U.S. PATENT DOCUMENTS

| | | | |
|---|---|---|---|
| 6,032,256 A * | 2/2000 | Bernard | 726/34 |
| 6,279,060 B1 * | 8/2001 | Luke et al. | 710/64 |
| 6,591,368 B1 | 7/2003 | Ryu | |
| 2005/0177710 A1 * | 8/2005 | Rothman et al. | 713/2 |
| 2007/0016761 A1 * | 1/2007 | Almeida et al. | 713/1 |
| 2007/0255936 A1 * | 11/2007 | Stemen | 713/2 |
| 2008/0147924 A1 * | 6/2008 | Lambert et al. | 710/62 |
| 2009/0144533 A1 * | 6/2009 | Mulcahy et al. | 713/2 |
| 2009/0212844 A1 * | 8/2009 | Darmawan et al. | 327/427 |
| 2010/0083366 A1 * | 4/2010 | Challener et al. | 726/17 |

FOREIGN PATENT DOCUMENTS

| | | |
|---|---|---|
| KR | 10-2001-0047483 A | 6/2001 |
| KR | 10-0316647 B1 | 1/2002 |
| KR | 10-2004-0091836 A | 11/2004 |
| KR | 10-0636151 B1 | 10/2006 |
| KR | 10-2007-0037922 A | 4/2007 |

\* cited by examiner

*Primary Examiner* — Mark Connolly
(74) *Attorney, Agent, or Firm* — Jefferson IP Law, LLP

(57) ABSTRACT

A control method of a computer system, including setting whether to enable a connection with at least one peripheral device in an operating system of the computer system to transmit and receive data; and enabling or disabling the connection with the at least one peripheral device based on the setting when the computer system is booted.

12 Claims, 4 Drawing Sheets

COMPUTER SYSTEM AND CONTROL METHOD THEREOF

CROSS-REFERENCE TO RELATED APPLICATIONS

This application claims the benefit of Korean Patent Application No. 2008-67074, filed on Jul. 10, 2008, in the Korean Intellectual Property Office, the disclosure of which is incorporated herein by reference.

BACKGROUND OF THE INVENTION

1. Field of the Invention

Aspects of the present invention relate to a computer system which is connected with a peripheral device to transmit and receive data, and a control method thereof, and more particularly, to a computer system which is selectively connected with a peripheral device, and a control method thereof.

2. Description of the Related Art

A computer system stores therein an operating system, various applications executed in the operating system, and data. The computer system may transmit and receive data with respect to peripheral devices by being connected with the peripheral devices through various connectors.

Computer systems which are generally used in companies store confidential data that has to be protected for security. Thus, a device is required to prevent peripheral devices from being connected to the computer system through a connector.

Locking devices have been installed in the connector to physically lock the connector and prevent connection with peripheral devices. However, if a corresponding unlocking device is lost, a user cannot unlock the connector. In addition, installation costs are incurred and installation processes are not convenient as a user has to install the locking device.

To tackle these problems, there are proposals to prevent data transmission and reception with peripheral devices through security applications executed in an operating system. In such cases, however, the security applications only prevent connection with peripheral devices while executing. If the security application ends, the peripheral devices may be connected to the computer system again. Also, data protection of the security application may be affected by failures of the operating system or other applications.

If the computer system operates not by the operating system in which the security application is executed, but by another operating system, the computer system may not prevent connection with the peripheral devices as the security application is not executing.

SUMMARY OF THE INVENTION

Aspects of the present invention provide a computer system which stably enables or disables a connection with a peripheral device without being affected by specific application execution or a replaced operating system, and a control method thereof.

Additional aspects of the present invention provide a computer system which enables or disables a connection with a peripheral device even without a physical device, and a control method thereof.

According to an aspect of the present invention a control method of a computer system is provided. The control method includes setting whether to enable a connection with at least one peripheral device in an operating system of the computer system to transmit and receive data; and enabling or disabling the connection with the at least one peripheral device based on the setting, when the computer system is booted.

According to another aspect of the present invention, the setting of whether to enable or disable the connection includes setting whether to enable the connection with the peripheral device by a setting application that is executed in the operating system.

According to another aspect of the present invention, the setting of whether to enable or disable the connection further includes recording and storing a setting of the setting application by a basic input/output system (BIOS) of the computer system.

According to another aspect of the present invention, setting of whether the enable or disable the connection by the setting application may include recording a setting about whether to enable the connection with the peripheral device in a limited record area of a random access memory included in the computer system, the random access memory having a limited record area to record data by the setting application.

According to another aspect of the present invention, the setting of whether to enable or disable the connection further includes recording and storing the setting recorded in the limited record area by the BIOS of the computer system.

According to another aspect of the present invention, the setting of whether to enable or disable the connection further includes ending the operating system and booting the computer system if the setting by the BIOS is completely recorded and stored.

According to another aspect of the present invention, a computer system is provided. The computer system includes at least one connector connected with at least one peripheral device to transmit and receive data; and a controller to set whether to enable a connection with the peripheral device through the connector in an operating system of the computer system and to enable or disable the connection with the at least one connector based on the setting when the computer system is booted.

According to another aspect of the present invention, the controller includes a setting application executed in the operating system to set whether to enable the connection with the at least one peripheral device.

According to another aspect of the present invention, the controller further includes a basic input/output system (BIOS) to record and store a setting by the setting application and to enable or disable the connection with the at least one peripheral device when the computer system is booted.

According to another aspect of the present invention, the computer system further includes a RAM (random access memory) which has a limited record area to record data by the setting application; wherein the controller records a setting about whether to enable the connection with the at least one peripheral device in the limited record area by the setting application.

According to another aspect of the present invention, the controller records and stores the setting recorded in the limited record area by the BIOS of the computer system.

According to another aspect of the present invention, the controller ends the operating system and boot the computer system if the setting is completely recorded and stored by the BIOS.

According to another aspect of the present invention, the controller further includes a system management interrupt (SMI) generator to generate a system management interrupt for the computer system to enter a mode where the setting about the connection with the peripheral device is primarily executed; and wherein the limited record area is recordable by the setting application if the SMI generator generates the system management interrupt.

According to another aspect of the present invention, the connector includes at least one of a universal serial bus (USB) port, a legacy port, an institute of electrical and electronics engineers (IEEE) 1394 port, a parallel advanced technology architecture (PATA) port and a serial advanced technology architecture (SATA) port.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
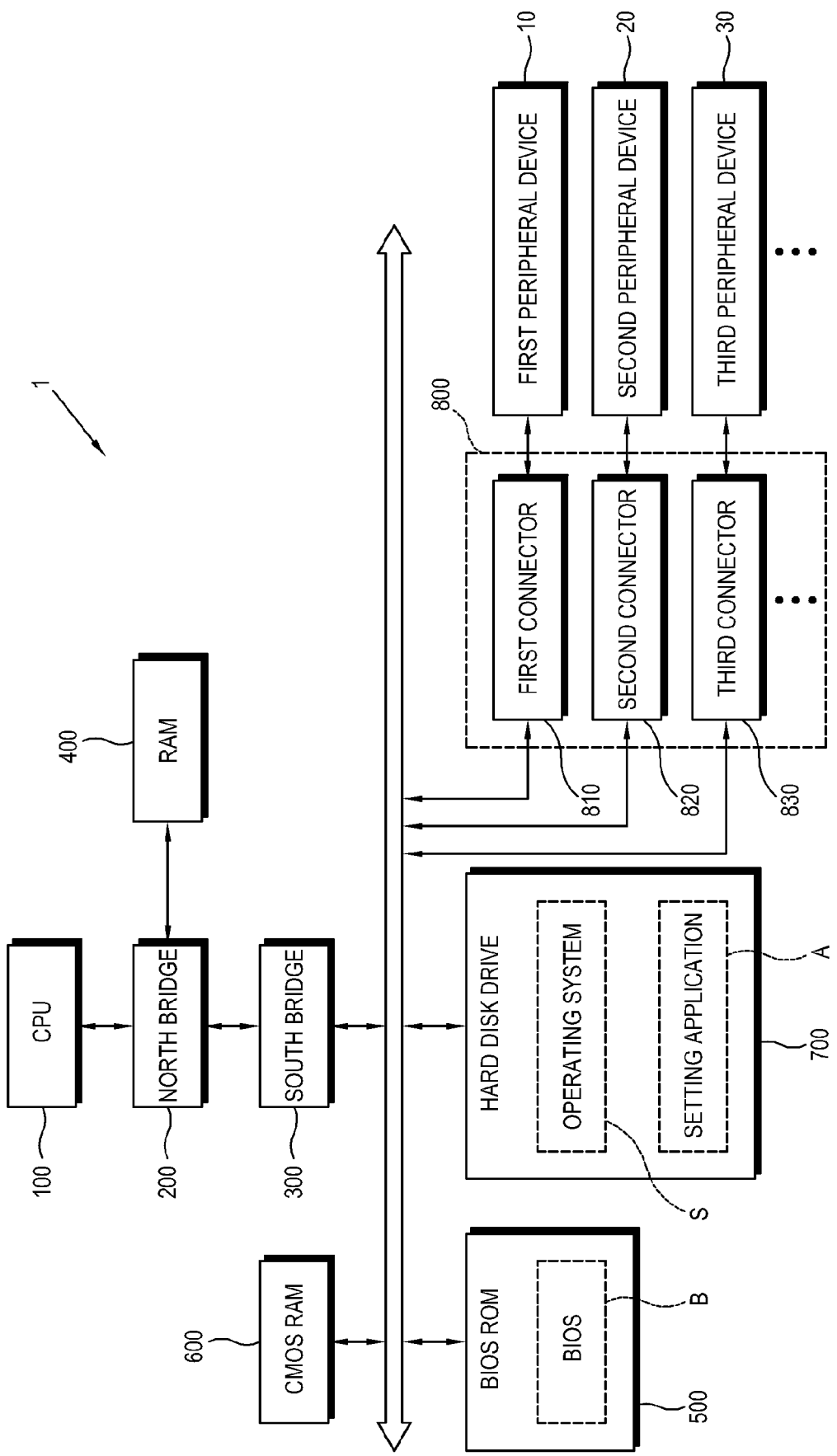
FIG. 1 is a control block diagram of a computer system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows a computer system 1 according to an embodiment of the present invention. The computer system 1 includes a connector 800 which is connected with peripheral devices 10, 20, and 30 to transmit and receive data with respect to at least one of the peripheral devices 10, 20, and 30; and a controller which selectively enables or disables a connection with the peripheral devices 10, 20, and 30 through the connector 800. According to other aspects of the present invention, the computer system 1 may include additional and/or different units. Similarly, the functionality of two or more units may be integrated into a single component.

The controller sets whether to enable the connection with the peripheral devices 10, 20 and 30 through the connector 800 in an operating system S, and enables or disables the connection with the peripheral devices 10, 20 and 30 by enabling or disabling the connector 800 based on the setting if the computer system is rebooted. The controller includes a CPU 100, a north bridge 200, a south bridge 300 as hardware, and a BIOS (basic input/output system) B, an operating system S, a setting application A as software, and may also include additional components. The controller operates by a control process between the elements.

The computer system 1 further includes a RAM (random access memory) 400, a BIOS ROM (read only memory) 500 to store therein the BIOS B, a CMOS (complementary metal-oxide semiconductor) RAM 600 to store therein CMOS setting, and a hard disk drive 700 to store therein the operating system S and the setting application A.

With the foregoing configuration, a user may set whether to enable the connector 800 through the setting application A executed in the operating system S and sets CMOS by the BIOS B to enable or disable the connector 800 when the computer system is booted. The setting application A and the BIOS B may include a routine or function to support the function thereof.

The CPU 100 is a central processing unit and executes the BIOS B, the operating system S, and the setting application A. The north bridge 200 acts as an interface between the CPU 100, the RAM 400, and a graphic device (not shown). The north bridge 200 includes a chip set, such as an MCH (memory control hub), and transmits data from the south bridge 300 to the RAM 400 to be processed by the CPU 100.

The south bridge 300 includes a sub-bus, such as a PCI (peripheral component interconnect) bus or an LPC (low pin count) bus. The south bridge 300 acts as an interface between the BIOS ROM 500, the CMOS RAM 600, the hard disk drive 700, and the connector 800, which are not interfaced by the north bridge 200. The south bridge 300 includes an SMI generator (not shown) to generate a system management interrupt. If the SMI generator generates an SMI, the CPU 100 enters a system management mode while the operating system is executing. The system management mode is one of various operation modes of the computer system 1. In this mode, a preset command takes priority over a normal execution. Thus, the ongoing normal execution is suspended, and the preset command is preferentially executed.

According to aspects of the present invention, while operating in the system management mode, a process to set whether to enable the connection with the peripheral devices 10, 20, and 30 is first to be executed. To support this operation, a limited record area of the RAM 400 may be recordable by the setting application A (to be described later).

The RAM 400 includes a volatile memory which temporarily stores data to be computed by the CPU 100 and initializes the recorded data if power is turned off. The RAM 400 is divided into an unlimited record area to record data by general applications and a limited record area to limitedly record and access data by the general applications. The limited record area may account for 1 MB or less in the RAM 400. In the limited record area, data recording is not available generally, and data recording and access is available by the setting application A only when open in the system management mode. The limited record area may be accessible by the BIOS B while open.

The BIOS ROM 500 stores therein the BIOS B to control and maintain elements of the computer system 1. The BIOS B is in the lowest layer of software. The operating system S and general applications are executed by the BIOS B. The BIOS B includes various routines including a routine to perform POST (power on self test) to test each element of the computer system 1. The POST is executed based on setting information stored in the CMOS RAM 600. If the CMOS setting includes a setting about whether to enable the connector 800, the connector 800 is enabled or disabled depending on the setting.

The BIOS B further includes a routine to store setting information recorded in the limited record area of the RAM 400, in the CMOS RAM 600 by the setting application A. The setting information may be referred to during the POST.

The CMOS RAM 600 stores therein settings about elements of the computer system 1 to be referred during the POST, i.e., CMOS settings. Recording in the CMOS RAM 600 is enabled by the BIOS B, and thus the setting of whether to enable the connector 800 may be added to the CMOS settings by the BIOS B.

One of the routines of the BIOS B provides a menu for a user to adjust the CMOS setting during system booting. An option to set whether to enable the connector 800 may be excluded from the menu. In this case, a user may set whether to enable the connector 800 only through the setting application A.

The hard disk drive 700 includes a non-volatile large capacity memory, and stores therein the operating system S and the setting application A, which are executed by the CPU 100.

The setting application A may be executed in the operating system S and adjusted by a user. The setting application A is provided to set whether to enable the connection with the peripheral devices 10, 20, and 30, i.e., whether to enable the connector 800. The setting application A may be programmed to include a function for the setting, or may include a dynamic link library (DLL) to be called from and used for other applications. Information which is set by the setting application A is stored in the CMOS RAM 600 to be referred during the POST. This process is performed by the BIOS B.

The setting application A allows the SMI generator (not shown) of the south bridge 300 to generate an SMI so that the computer system 1 enters the system management mode. In the system management mode, the setting information may be recorded in the limited record area of the RAM 400 by the setting application A.

A reason to record the setting information in the limited record area is to prevent interference between the operating system S and other applications, or information loss due to data migration in the unlimited record area if the setting information is recorded in the unlimited record area. If the setting information is recorded in the limited record area by the setting application A, the setting information in the limited record area may be stored in the CMOS RAM 600 by the BIOS B.

The connector 800 is connected with the peripheral devices 10, 20, and 30 to transmit and receive data. The connector 800 may have various configurations, e.g., a universal serial bus (USB) port, a legacy port (such as a serial port or a parallel port), an IEEE 1394 port, a parallel advanced technology architecture (PATA) port, a serial advanced technology architecture (SATA), a wireless connector (such as a Bluetooth connector), or the like. The connector 800 may be a combination of one or more (at least one of) the above ports. For example, the connector 800 may include a USB port, an IEEE 1394 port, and a legacy port.

With the foregoing configuration, a process of enabling or disabling the connector 800 in the computer system 1 according an embodiment of the present invention will be described with reference to FIGS. 2 to 4.

Figure 2:
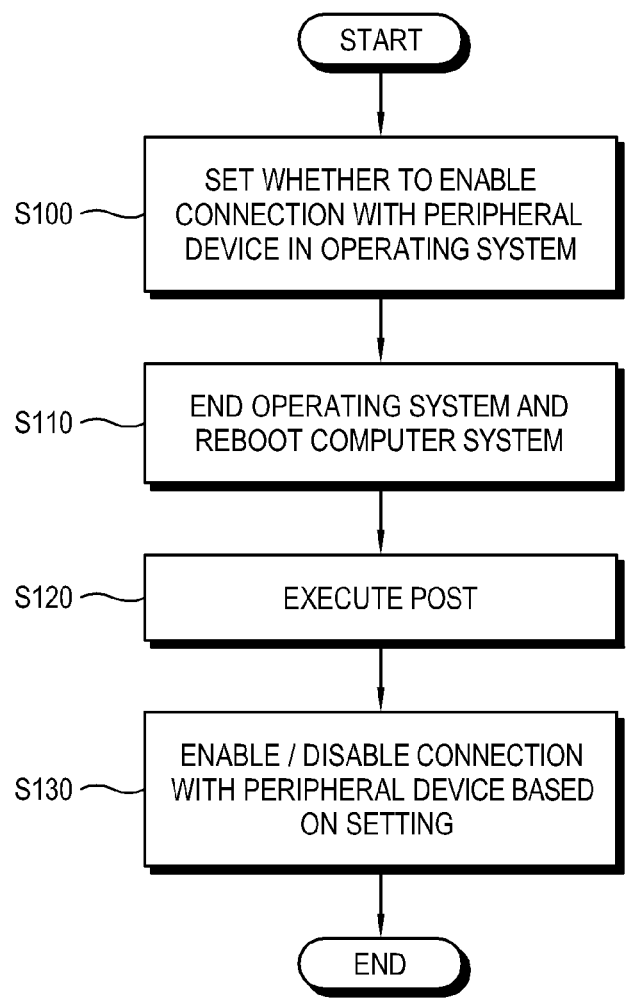
FIG. 2 is a control flowchart of the computer system according to an embodiment of the present invention.

FIG. 2 is a control flowchart of the computer system 1 according to an embodiment of the present invention. In the operating system S, a user sets whether to enable the connection with the peripheral devices 10, 20 and 30 in operation S100. If the setting is completed, the operating system S ends and the system is rebooted in operation S110. The BIOS B executes the POST in operation S120, and the connection with the peripheral devices 10, 20, and 30 is enabled or disabled on the basis of the setting in operation S130.

There is no need to perform the operation S110 right after the operation S100, and there may be an interval between the two operations. The operating system S need not end right after the setting is completed. In this case, the operation S120 is performed after the operating system S ends and the system is rebooted.

Hereinafter, the process is divided into a process by the setting application A and a process by the BIOS B to be described in more detail. FIG. 3 is a flowchart to describe a control process by the setting application A in the computer system 1 according an embodiment of the present invention.

Figure 3:
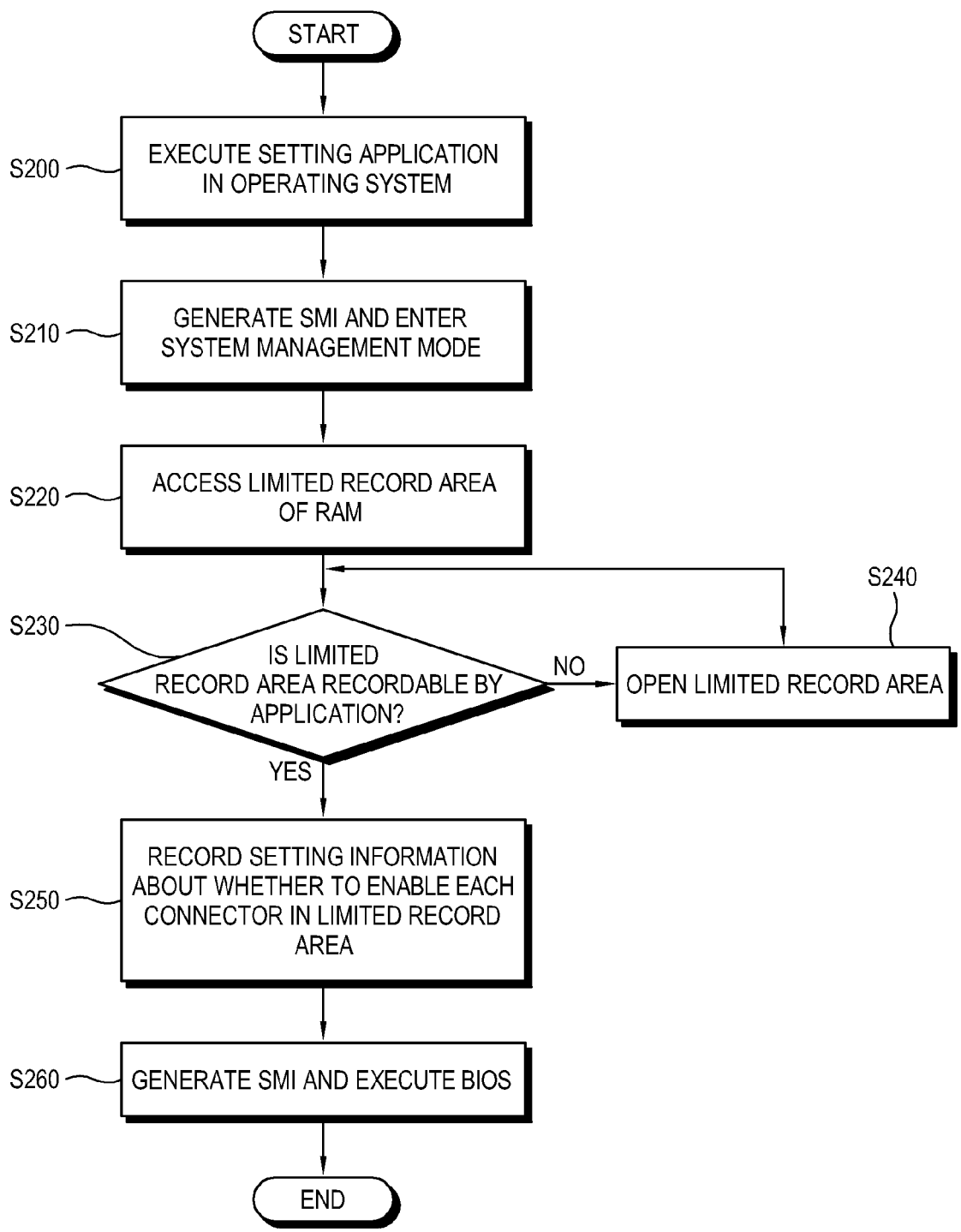
FIG. 3 is a flowchart of a control process by a setting application in the computer system according to an embodiment of the present invention.

As shown in FIG. 3, a user executes the setting application A in the operating system S in operation S200. The setting application A controls the SMI generator to generate an SMI to enter the system management mode in operation S210.

The setting application A accesses the limited record area of the RAM 400 in operation S220, and determines whether the limited record area is recordable in operation S230. If the limited area is not recordable, the setting application A opens the limited record area, i.e., lifts the record limitation from the limited record area, in operation S240.

In operation S250, the setting application A records setting information about whether to enable the connector 800 in the limited record area. If the recording is completed, the setting application A generates the SMI to execute the BIOS B in operation S260. Then, the process based on the setting application A ends.

Figure 4:
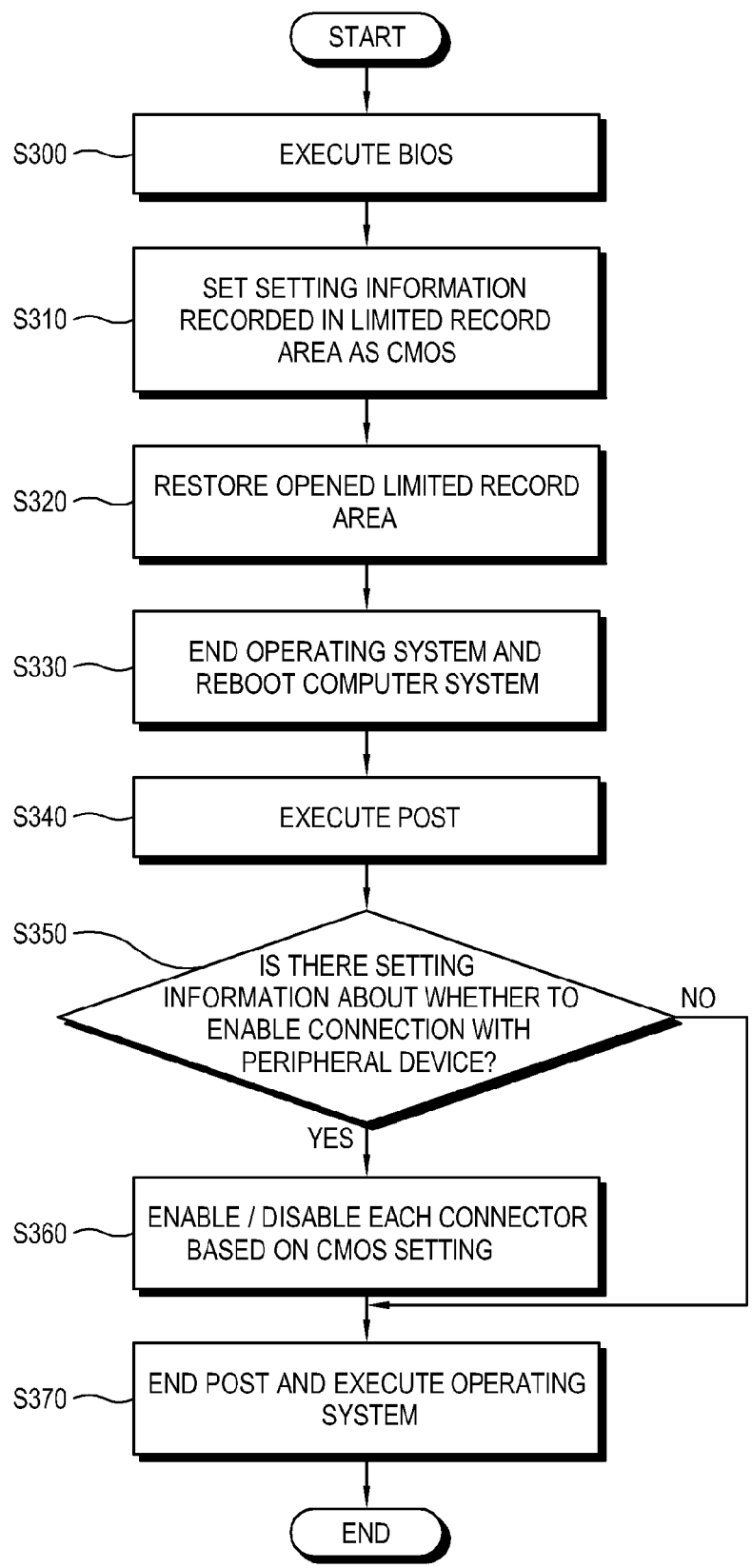
FIG. 4 is a flowchart of a control process by a BIOS in the computer system according to an embodiment of the present invention.

FIG. 4 is a flowchart of a control process by the BIOS B in the computer system 1. The process in FIG. 4 may follow the process in FIG. 3.

The BIOS B is executed by the SMI generated by the setting application A in operation S300. The BIOS B sets the setting information recorded in the limited record area as CMOS in operation S310. The information about whether to enable the connector 800 is stored in the CMOS RAM 600. If the CMOS setting is completed, the BIOS B restores the opened limited record area and prevents access of the operating system S or other applications in operation S330.

The BIOS B ends the operating system S and reboots the system in operation S330. The POST is initiated to test the connector 800 in operation S340. In operation S350, whether the setting information about whether to enable the connector 800 is stored in the CMOS RAM 600 is determined The setting information may be set to disable all connectors 800 or set to selectively enable or disable one or more of the connectors 810, 820, and 830. The BIOS B enables or disables the connectors 810, 820, and/or 830 based on the CMOS setting. Without the setting information, current status of the connector 800 may not change.

If the foregoing processes end, the POST is completed and the operating system S is executed in operation S370. The connection with the peripheral devices 10, 20, and 30 is prevented as the connector 800 is disabled. Since the connector 800 is disabled by the BIOS B, the system is not rebooted by other operating systems S.

As described above, the connector 800 is enabled by the setting application A and the BIOS B and the setting is executed in the POST to thereby prevent data leakage due to connection with the peripheral devices 10, 20 and 30.

Aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), magnetic tapes, floppy disks, and optical data storage devices (such as CDs, DVDs, and Blu-ray discs). Aspects of the present invention may also be embodied as carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to aspects of the present invention, the computer system may set whether to enable connection with peripheral devices in an operating system and enable or disable the connection with the peripheral devices based on the setting when the system is rebooted. Thus, data leakage due to various causes such as replaced operating systems or application failures may be prevented for better security.

Also, a computer system according to aspects of the present invention includes software configuration without requiring additional hardware. Aspects of the present invention are thus also applicable to existing computers through setting application installation and BIOS updates, and a user can improve security of the computer system with affordable costs.

As for computer systems in companies, the connection with peripheral devices may be flexibly selected depending on security policy changes. Since the connection with peripheral devices is disabled when the computer system is rebooted, potential data leakage due to other operating systems in the peripheral devices may be prevented.

Unlike a conventional computer system, a security application does not need to be executing to disable the connection with peripheral devices. Computer system resources can be saved and potential data leakage due to software failure can be prevented.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A control method of a computer system having a random access memory (RAM) including a restricted record area and a non-restricted record area and at least one connector to connect with a peripheral device, the control method comprising:
    setting of setting information as to whether to enable or disable one or more of the at least one connector via a setting application executed by an operating system of the computer system;
    storing the setting information in the restricted record area of the RAM, the setting information indicating which of the at least one connector is enabled or disabled; and
    enabling or disabling the one or more of the at least one connector based on the setting information, when the computer system is booted such that the disabled ones of the one or more of the at least one connector cannot be enabled until the computer system is re-booted.

2. The control method according to claim 1, wherein the storing of the setting information set by the setting application is performed by a basic input/output system (BIOS) of the computer system.

3. The control method according to claim 2, wherein the setting of information as to whether to enable or disable the connection further comprises ending the operating system and booting the computer system if the setting by the BIOS is completely recorded and stored.

4. A computer system, comprising:
    a random access memory (RAM) including a restricted record area and a non-restricted record area;
    at least one connector connected with at least one peripheral device to transmit and receive data; and
    a controller to set setting information indicating whether to enable or disable one or more of the at least one connector connected with the at least one peripheral device and to enable or disable the connection with the one or more of the at least one connector based on the setting information when the computer system is booted,
    wherein the controller sets whether to selectively enable or disable the one or more of the at least one connector via a setting application executed by an operating system of the computer system, and
    wherein the setting application records the setting information in the restricted record area, the setting information indicating which of the one or more of the at least one connector is enabled or disabled.

5. The computer system according to claim 4, wherein the controller records and stores the setting information recorded in the restricted record area using a basic input/output system (BIOS) of the computer system.

6. The computer system according to claim 5, wherein the controller ends the operating system and boots the computer system if the setting is completely recorded and stored by the BIOS.

7. The computer system according to claim 4, wherein the controller further comprises:
    a system management interrupt (SMI) generator to generate a system management interrupt for the computer system to enter a mode where the setting about the connection with the peripheral device is primarily executed,
    wherein the restricted record area is recordable by the setting application if the SMI generator generates the system management interrupt.

8. The computer system according to claim 4, wherein the connector comprises at least one of a universal serial bus (USB) port, a legacy port, an institute of electrical and electronics engineers (IEEE) 1394 port, a parallel advanced technology architecture (PATA) port and a serial advanced technology architecture (SATA) port.

9. A computer system, comprising:
    a random access memory (RAM) including a restricted record area and a non-restricted record area;
    at least one connector to connect with a peripheral device; and
    a controller to selectively enable or disable one or more of the at least one connector when the computer system is booted such that the disabled connectors cannot be enabled until the computer system is re-booted,
    wherein the controller sets setting information regarding whether to selectively enable or disable the one or more of the at least one connector via a setting application executed by an operating system of the computer system, and
    wherein the setting application records the setting information in the restricted record area, the setting information indicating which of the one or more of the at least one connector is enabled or disabled.

10. A method of restricting access to at least one connector of a computer system having a Random Access Memory (RAM) including a restricted record area and a non-restricted record area, the method comprising:
    setting of setting information as to whether to enable or disable one or more of the at least one connector via a setting application executed by an operating system of the computer system;
    storing the setting information in the restricted record area of the RAM, the setting information indicating which of the one or more of the at least one connector to enable or disable;

rebooting the computer system; and selectively enabling or disabling the one or more of the at least one connector based on the setting information while the computer system is re-booting, such that disabled connectors cannot be enabled until the computer system is re-booted.

11. The method of claim 10, further comprising:

recording the setting information indicating which of the one or more of the at least one connector to enable or disable in a complementary metal-oxide-semiconductor (CMOS) RAM.

12. The method of claim 11, wherein the enabling or disabling comprises: enabling or disabling the one or more of the at least one connector based on the setting information recorded in the CMOS RAM.

* * * * *